United States Patent Office 3,227,668
Patented Jan. 4, 1966

3,227,668
WAX-EXTENDED EPOXIDE-ETHYLENE VINYL
ACETATE COMPOSITION
Guenter R. Ackermann, Broomall, Pa., assignor to The
Atlantic Refining Company, Philadelphia, Pa., a corporation of Pennsylvania
No Drawing. Filed Sept. 11, 1961, Ser. No. 137,069
19 Claims. (Cl. 260—28)

This invention relates to novel epoxide resin compositions, particularly to wax-extended epoxide resin compositions.

Epoxide resins per se are well-known in the prior art. Epoxide resins are sometimes called epoxy or ethoxyline resins. Generally, they comprise a polyether derivative of a polyhydroxy organic compound such as a polyhydroxy alcohol or polyhydroxy phenol. For example, United States Patent No. 2,324,483 discloses epoxide resin compositions prepared by reacting a phenol containing at least two hydroxy groups with an epihalohydrin such as epichlorohydrin to produce a product having at least two

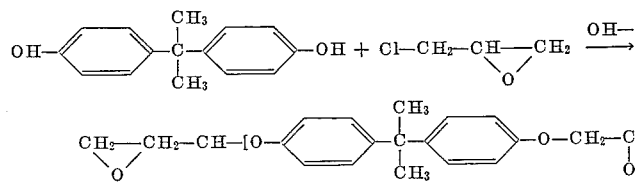

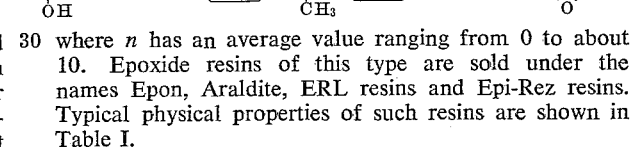

epoxy groups and which can be cured to a thermoset and infusible mass by the use of a suitable curing agent, such as carboxylic or polybasic acids or acid anhydrides. Other materials which have been used to cure epoxide resins include organic amines as disclosed in United States Patent No. 2,444,333. Typically, the epoxide resins cured with any of the foregoing types of curing agents are hard and brittle.

These epoxide resins are particularly useful in coating and casting applications. In a similar manner, extended epoxide resin compositions find particular utility as corrosion resistant coatings and surface coatings for concrete, asphalt, wood and steel, such as metal pipes, construction steel, girders, etc.

Heretofore, extenders which have been used and found compatible with epoxy resins have been limited to highly polar or aromatic materials. Typical extenders which have been used include phenolic pitch, coal tar pitch, methyl isobutyl ketone, toluene, benzyl alcohol, polyamine-fatty acid pitch, and aromatic petroleum residues.

Since expense is an important factor in surfacing compositions, research workers have been striving to develop extended epoxide resin compositions which retain many or all of the desirable properties of the epoxy resins. The instant invention provides a unique relatively inexpensive resinous material employing as one of the components a material heretofore believed to be incompatible with epoxy resins.

It is, therefore, an object of this invention to provide novel epoxide resin compositions.

It is another object of this invention to provide novel epoxide resin compositions which are capable of conversion to thermoset infusible insoluble resin compositions.

It is another object of this invention to provide epoxide resin coating compositions which are economical in cost, can be utilized in any simple economical manner and are extremely durable and waterproof under the most adverse conditions.

Other objects of this invention will become apparent from the following description and claims.

Broadly stated, the compositions of this invention comprise an epoxide resin, a curing agent therefor, an ethylene-vinyl acetate copolymer and a petroleum wax.

The epoxide resins used in this invention are, as stated above, well-known in the prior art. They are described thoroughly in both the patented art and the published literature. For example, they are described in United States Patents Nos. 2,324,483 and 2,444,333 and British Patents Nos. 518,057 and 579,698. Generally, the epoxide resins described in these patents comprise the reaction products of an epihalohydrin, such as epichlorohydrin, and a phenol having at least two phenolic hydroxy groups such as bis(4-hydroxyphenyl)-2,2-propane (Bisphenol A). The epoxide resins used in this invention have more than one epoxy group per molecule. They may be prepared by reacting a polyhydroxy alcohol or a polyhydroxy phenol, such as hydroquinone, resorcinol, glycerine, or condensation products of phenols with ketones such as Bisphenol A, with an epihalohydrin such as eipchlorohydrin. For example, the reaction between Bisphenol A and epichlorohydrin is as follows:

where $n$ has an average value ranging from 0 to about 10. Epoxide resins of this type are sold under the names Epon, Araldite, ERL resins and Epi-Rez resins. Typical physical properties of such resins are shown in Table I.

*Table I*

| Epoxide Resin | Epoxy Equiv. | Ave. Mol. Wt. |
|---|---|---|
| Epon 820 | 175–210 | 350–400 |
| Epon 828 | 175–210 | 250–400 |
| Epon 834 | 225–290 | 450 |
| Araldite 6010 | 195 | |
| Araldite 6020 | 210 | |
| ERL 2774 | 185–200 | 350–400 |
| Epi-Rez 510 | 180–200 | 350–400 |

All of the epoxide resins noted in Table I are prepared by reacting Bisphenol A with epichlorohydrin. Additional information concerning these types of resins may be found in Lee and Neville, Epoxy Resins, McGraw-Hill Book Company, Inc., New York, 1957.

The curing agents which may be used in this invention are those which are well-known and conventionally used in epoxide resin technology. For example, primary aliphatic amines and their adducts, secondary aliphatic amines, cyclic aliphatic amines, tertiary amines, aromatic amines, liquid polyamide resins containing free amines or amine decomposition products, organic dibasic and polybasic acids, and organic acid anhydrides may be used. Examples of specific curing agents which may be used in the preparation of the novel epoxide resin compositions of this invention include ethylene diamine, diethylenetriamine, triethylene tetramine, and m-phenylene diamine.

The ethylene-vinyl acetate copolymers are used in this invention in an amount ranging between 0.5 and 5.0 weight percent, preferably between 3.0 and 4.0 weight percent. They should have a molecular weight of at least 25,000, preferably from 30,000 to 45,000, and a polymerized vinyl acetate content of from 5.0 weight percent to 40 weight percent, preferably in excess of 25 weight percent and ranging up to 35 weight percent.

These copolymers may be prepared by copolymerizing a mixture of ethylene and vinyl acetate in the presence of a catalyst, such as oxygen or an organic peroxide, for example, t-butyl hydroperoxide, in a tubular reactor at pressures ranging between 15,000 p.s.i.g. and 30,000 p.s.i.g. at a temperature ranging between 150° C. and 250° C. and then separating the resultant copolymer from unreacted monomers by flashing off the unreacted monomers.

The wax component of the composition of this invention is used in amounts ranging from 10 to 70 weight percent, preferably from 30 to 50 weight percent. It may be a paraffin wax, a microcrystalline wax, or a mixture of paraffin and microcrystalline waxes.

Paraffin waxes are crystalline petroleum products which are removed from distillates or overhead stocks by sweating or solvent separation. These waxes ordinarily have a melting point in the general range of 115° F. to 200° F. They are generally agreed to have a plate-like crystalline structure and are relatively hard, brittle and fairly easily fractured. Paraffin waxes are generally obtained from the wax-containing oil distillate fractions, and are separated by oil-removal methods, such as chilling and subsequent refining operations (e.g. sweating).

Microcrystalline waxes are well known to those in the petroleum art and such products have also been designated as amorphous or petrolatum waxes. The melting point range of microcrystalline waxes is from about 140° F. to 200° F. The available commercial grades vary somewhat in hardness and melting point. Microcrystalline wax is to be distinguished from paraffin wax which is derived from more volatile and lighter fractions in the distillation of petroleum and is markedly crystalline and brittle compared to microcrystalline wax which is non-brittle.

The following examples serve to further illustrate the instant invention.

EXAMPLE I

Various blends of epoxide resins, curing agents, ethylene-vinyl acetate copolymers and wax were compounded in accordance with Table II. All amounts shown are in weight percent.

Table II

| Sample No. | Epoxide Resin [1] | Curing Agent Type | Curing Agent Amount | Ethylene-Vinyl Acetate Copolymer [2] | Wax [3] |
|---|---|---|---|---|---|
| 1 | 90 | | | | 10 |
| 2 | 70 | | | | 30 |
| 3 | 50 | | | | 70 |
| 4 | 30 | | | | 70 |
| 5 | 10 | | | | 90 |
| 6 | 89 | EDA [4] | 2 | | 9 |
| 7 | 69 | EDA [4] | 2 | | 29 |
| 8 | 49 | EDA [4] | 2 | | 49 |
| 9 | 29 | EDA [4] | 2 | | 69 |
| 10 | 9 | EDC [4] | 2 | | 89 |
| 11 | 88 | | | 3 | 9 |
| 12 | 68 | | | 3 | 29 |
| 13 | 48 | | | 3 | 49 |
| 14 | 28 | | | 3 | 69 |
| 15 | 8 | | | 3 | 89 |
| 16 | 87 | EDA | 2 | 3 | 8 |
| 17 | 67 | EDA | 2 | 3 | 28 |
| 18 | 47 | EDA | 2 | 3 | 48 |
| 19 | 27 | EDA | 2 | 3 | 68 |
| 20 | 7 | EDA | 2 | 3 | 88 |
| 21 | 50 | MPDA [5] | 2 | 3 | 45 |
| 22 | 49 | DETA [6] | 3 | 3 | 45 |
| 23 | 49 | TETA [7] | 3 | 3 | 45 |

[1] Epon 828 (manufactured by the Shell Chemical Co.).
[2] Elvax 250 (manufactured by The du Pont Company). This material has a molecular weight of about 40,000 and a polymerized vinyl acetate content of about 28 weight percent.
[3] Paraffin wax, melting point 145° F.-150° F.
[4] Ethylene diamine.
[5] m-Phenylene diamine.
[6] Diethylene triamine.
[7] Triethylene tetramine.

Each of the above blends was heated at a temperature of about 175° F. with agitation for 1 to 2 minutes. When removed from the heat and agitation ceased, Sample Nos. 1 to 5 immediately started to form two distinct phases. Upon cooling to room temperature the epoxide resin phase was unchanged and the solidified wax floated thereon. Sample Nos. 6 to 10 also immediately started to separate into two phases when agitation was stopped. However, since the ethylene diamine curing agent was present in these samples, the final product was a solid epoxide resin phase and a separate solid wax phase.

On the other hand, Sample Nos. 11 to 15 remained homogeneous upon removal from the heat and cessation of the agitation. At room temperature these samples were still homogeneous. Sample Nos. 16 to 23 were homogeneous upon removal from the heat and almost immediately cured to form hard brittle resinous materials which were similar to epoxide resins in their thermosetting, insolubility, and infusibility characteristics.

While it is possible to produce compositions according to this invention wherein the epoxide resin contains 90 weight percent wax, in those instances where a hard surface coating is desired, such as coating glass with a pigmented epoxide resin composition, it is, as stated above, preferred to have a maximum of 50 weight percent wax in the total composition.

It will be understood that other materials such as fillers and pigments may also be incorporated into the compositions of this invention without departing from the spirit thereof.

I claim:

1. A wax-extended epoxide resin composition consisting essentially of an epoxide resin prepared by reacting an epihalohydrin with a compound having more than one hydroxy group, said compound selected from the group consisting of polyhydroxy alcohols and polyhydroxy phenols and bisphenol condensation products formed by condensing phenols with ketones, 10 to 70 weight percent petroleum wax, and 0.5 to 5.0 weight percent copolymer of ethylene and vinyl acetate.

2. A wax-extended epoxide resin composition consisting essentially of a cured epoxide resin prepared by reacting an epihalohydrin with a compound having more than one hydroxy group, said compound selected from the group consisting of polyhydroxy alcohols and polyhydroxy phenols and bisphenol condensation products formed by condensing phenols with ketones, 10 to 70 weight percent petroleum wax and 0.5 to 5.0 weight percent copolymer of ethylene and vinyl acetate.

3. A wax-extended epoxide resin composition consisting essentially of an epoxide resin prepared by reacting an epihalohydrin with a compound having more than one hydroxy group, said compound selected from the group consisting of polyhydroxy alcohols and polyhydroxy phenols and bisphenol condensation products formed by condensing phenols with ketones, 30 to 50 weight percent petroleum wax and 3.0 to 4.0 weight percent copolymer of ethylene and vinyl acetate.

4. A wax-extended epoxide resin composition consisting essentially of a cured epoxide resin prepared by reacting an epihalohydrin with a compound having more than one hydroxy group, said compound selected from the group consisting of polyhydroxy alcohols and polyhydroxy phenols and bisphenol condensation products formed by condensing phenols with ketons, 30 to 50 weight percent petroleum wax and 3.0 to 4.0 weight percent polymer of ethylene and vinyl acetate.

5. A wax-extended epoxide resin composition consisting essentially of an epoxide resin prepared by reacting an epihalohydrin with a compound having more than one hydroxy group, said compound selected from the group consisting of polyhydroxy alcohols and polyhydroxy phenols and bisphenol condensation products formed by condensing phenols with ketones, 30 to 50 weight percent petroleum wax, and 0.5 to 5.0 weight percent copolymer of ethylene and vinyl acetate; said petroleum wax having a melting point ranging between 115° F. and 200° F., said copolymer having a molecular weight of at least 25,000 and a polymerized vinyl acetate content of from 5.0 to 40.0 weight percent.

6. A wax-extended epoxide resin composition consisting essentially of a cured epoxide resin prepared by reacting an epihalohydrin with a compound having more than one hydroxy group, said compound selected from the group consisting of polyhydroxy alcohols and polyhydroxy phenols and bisphenol condensation products formed by condensing phenols with ketones, 10 to 70 weight percent petroleum wax, and 0.5 to 5.0 weight pecent copolymer of ethylene and vinyl acetate, said petroleum wax having a melting point ranging between 115° F. and 200° F., said copolymer having a molecular weight of at least 25,000 and a polymerized vinyl acetate content of from 5.0 to 40.0 weight percent.

7. A wax-extended epoxide resin composition consisting essentially of an epoxide resin prepared by reacting an epihalohydrin with a compound having more than one hydroxy group, said compound selected from the group consisting of polyhydroxy alcohols and polyhydroxy phenols and bisphenol condensation products formed by condensing phenols with ketones, 30 to 50 weight percent petroleum wax, and 3.0 to 4.0 weight percent copolymer of ethylene and vinyl acetate, said petroleum wax having a melting point ranging between 115° F. and 200° F., said copolymer having a molecular weight of at least 25.000 and a polymerized vinyl acetate content of from 5.0 to 4.0 weight percent.

8. A wax-extended epoxide resin composition consisting essentially of an epoxide resin prepared by reacting an epihalohydrin with a compound having more than one hydroxy group, said compound selected from the group consisting of polyhydroxy alcohols and polyhydroxy phenols and bisphenol condensation products formed by condensing phenols with ketones, 10 to 70 weight percent paraffin wax, and 0.5 to 5.0 weight percent copolymer of ethylene and vinyl acetate, said paraffin wax having a melting point ranging between 115° F. and 200° F., said copolymer having a molecular weight of from 25,000 to 45,000 and a polymerized vinyl acetate content of from 5.0 to 40.0 weight percent.

9. A wax-extended epoxide resin composition consisting essentially of a cured epoxide resin prepared by reacting an epihalohydrin with a compound having more than one hydroxy group, said compound selected from the group consisting of polyhydroxy alcohols and polyhydroxy phenols and bisphenol condensation products formed by condensing phenols with ketones, 10 to 70 weight percent paraffin wax, and 0.5 to 5.0 weight percent copolymer of ethylene and vinyl acetate, said paraffin wax having a melting point ranging between 115° F. and 200° F., said copolymer having a molecular weight of from 25,000 to 45,000, and a polymerized vinyl acetate content of from 5.0 to 40.0 weight percent.

10. A wax-extended epoxide resin composition consisting essentially of an epoxide resin, prepared by reacting an epihalohydrin with a compound having more than one hydroxy group, said compound selected from the group consisting of polyhydroxy alcohols and polyhydroxy phenols and bisphenol condensation products formed by condensing phenols with ketones, 10 to 70 weight percent microcrystalline wax, and 0.5 to 5.0 weight percent copolymer of ethylene and vinyl acetate, said microcrystalline wax having a melting point ranging between 140° F. and 200° F., said copolymer having a molecular weight of from 25,000 to 45,000 and a polymerized vinyl acetate content of from 5.0 to 40.0 weight percent.

11. A wax-extended epoxide resin composition consisting essentially of a cured epoxide resin prepared by reacting an epihalohydrin with a compound having more than one hydroxy group, said compound selected from the group consisting of polyhydroxy alcohols and polyhydroxy phenols and bisphenol condensation products formed by condensing phenols with ketones, 10 to 70 weight percent microcrystalline wax, and 0.5 to 5.0 weight percent copolymer of ethylene and vinyl acetate, said microcrystalline wax having a melting point ranging between 140° F. and 200° F., said copolymer having a molecular weight of from 25,000 to 45,000, and a polymerized vinyl acetate content of from 5.0 to 40.0 weight percent.

12. A wax-extended epoxide resin composition consisting essentially of an epoxide resin prepared by reacting an epihalohydrin with a compound having more than one hydroxy group, said compound selected from the group consisting of polyhydroxy alcohols and polyhydroxy phenols and bisphenol condensation products formed by condensing phenols with ketones, 30 to 50 weight percent paraffin wax, and 3.0 to 4.0 weight percent copolymer of ethylene and vinyl acetate, said paraffin wax having a melting point ranging between 115° F. and 200° F., said copolymer having a molecular weight of from 25,000 to 45,000 and a polymerized vinyl acetate content of from 5.0 to 40.0 weight percent.

13. A wax-extended epoxide resin composition consisting essentially of an epoxide resin prepared by reacting an epihalohydrin with a compound having more than one hydroxy group, said compound selected from the group consisting of polyhydroxy alcohols and polyhydroxy phenols and bisphenol condensation products formed by condensing phenols with ketones, 30 to 50 weight percent microcrystalline wax, and 3.0 to 4.0 weight percent copolymer of ethylene and vinyl acetate, said microcrystalline wax having a melting point ranging between 140° F. and 200° F., said copolymer having a molecular weight of from 25,000 to 45,000, and a polymerized vinyl acetate content of from 5.0 to 40.0 weight percent.

14. A wax-extended epoxide resin composition consisting essentially of an epoxide resin prepared by reacting an epihalohydrin with a compound having more than one hydroxy group, said compound selected from the group consisting of polyhydroxy alcohols and polyhydroxy phenols and bisphenol condensation products formed by condensing phenols with ketones, 30 to 50 weight percent paraffin wax, and 3.0 to 4.0 weight percent copolymer of ethylene and vinyl acetate, said paraffin wax having a melting point ranging between 140° F. and 200° F., said copolymer having a molecular weight of from 30,000 to 45,000 and a polymerized vinyl acetate content in excess of 25 weight percent and ranging up to 35 weight percent.

15. A wax-extended epoxide resin composition consisting essentially of a cured epoxide resin prepared by reacting an epihalohydrin with a compound having more than one hydroxy group, said compound selected from the group consisting of polyhydroxy alcohols and polyhydroxy phenols and bisphenol condensation products formed by condensing phenols with ketones, 30 to 50 weight percent paraffin wax, and 3.0 to 4.0 weight percent copolymer of ethylene and vinyl acetate, said paraffin wax having a melting point ranging between 140° F. and 200° F., said copolymer having a molecular weight of from 30,000 to 45,000, and a polymerized vinyl acetate content in excess of 25 weight percent and ranging up to 35 weight percent.

16. A wax-extended epoxide resin composition consisting essentially of an epoxide resin prepared by reacting an epihalohydrin with a compound having more than one hydroxy group, said compound selected from the group consisting of polyhydroxy alcohols and polyhydroxy phenols and bisphenol condensation products formed by condensing phenols with ketones, 30 to 50 weight percent microcrystalline wax, and 3.0 to 4.0 weight percent copolymer of ethylene and vinyl acetate, said microcrystalline wax having a melting point ranging between 140° F. and 200° F., said copolymer having a molecular weight of from 30,000 to 45,000, and a polymerized vinyl acetate content in excess of 25 weight percent and ranging up to 35 weight percent.

17. A wax-extended epoxide resin composition consisting essentially of a cured epoxide resin prepared by reacting an epihalohydrin with a compound having more than one hydroxy group, said compound selected from the group consisting of polyhydroxy alcohols and polyhydroxy phenols and bisphenol condensation products formed by condensing phenols with ketones, 30 to 50 weight percent microcrystalline wax, and 3.0 to 4.0 weight percent copolymer of ethylene and vinyl acetate, said microcrystalline wax having a melting point ranging between 140° F. and 200° F., said copolymer having a molecular weight of from 30,000 to 45,000, and a polymerized vinyl acetate content in excess of 25 weight percent and ranging up to 35 weight percent.

18. A wax-extended epoxide resin composition consisting essentially of an epoxide resin prepared by reacting an epihalohydrin with a compound having more than one hydroxy group, said compound selected from the group consisting of polyhydroxy alcohols and polyhydroxy phenols and bisphenol condensation products formed by condensing phenols with ketones, 35 to 50 weight percent blend of paraffin and microcrystalline wax, and 3.0 to 4.0 weight percent copolymer of ethylene and vinyl acetate, said blend having a melting point ranging between 115° F. and 200° F., said copolymer having a molecular weight of from 30,000 to 45,000, and a polymerized vinyl acetate content in excess of 25 weight percent and ranging up to 35 weight percent.

19. A wax-extended epoxide resin composition consisting essentially of a cured epoxide resin prepared by reacting an epihalohydrin with a compound having more than one hydroxy group, said compound selected from the group consisting of polyhydroxy alcohols and polyhydroxy phenols and bisphenol condensation products formed by condensing phenols with ketones, 35 to 50 weight percent blend of paraffin and microcrystalline wax, and 3.0 to 4.0 weight percent copolymer of ethylene and vinyl acetate, said blend having a melting point ranging between 115° F. and 200° F., said copolymer having a molecular weight of from 30,000 to 45,000, and a polymerized vinyl acetate content in excess of 25 weight percent and ranging up to 35 weight percent.

References Cited by the Examiner
UNITED STATES PATENTS

| | | | |
|---|---|---|---|
| 2,602,785 | 7/1952 | Wiles et al. | 260—45.5 |
| 2,877,196 | 5/1959 | Reding | 260—28.5 |

MORRIS LIEBMAN, *Primary Examiner.*

MILTON STERMAN, *Examiner.*